United States Patent
Yang

(10) Patent No.: US 9,593,877 B2
(45) Date of Patent: Mar. 14, 2017

(54) REFRIGERATOR HAVING LOCKING DEVICE FOR ICE BUCKET AND METHOD FOR INSTALLATION OF LOCKING DEVICE OF ICE BUCKET

(71) Applicant: Dongbu Daewoo Electronics Corporation, Seoul (KR)

(72) Inventor: Sung Jin Yang, Seoul (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 0 days.

(21) Appl. No.: 14/834,268

(22) Filed: Aug. 24, 2015

(65) Prior Publication Data

US 2016/0370099 A1    Dec. 22, 2016

(30) Foreign Application Priority Data

Jun. 17, 2015   (KR) .......................... 10-2015-0085834

(51) Int. Cl.
*F25D 23/00* (2006.01)
*F25C 5/18* (2006.01)
*B23P 15/26* (2006.01)
*F25D 23/02* (2006.01)

(52) U.S. Cl.
CPC ............ *F25D 23/006* (2013.01); *B23P 15/26* (2013.01); *F25C 5/182* (2013.01); *F25D 23/00* (2013.01); *F25D 23/025* (2013.01); *F25D 23/028* (2013.01)

(58) Field of Classification Search
CPC ...... F25D 23/00; F25D 23/025; F25D 23/028; F25D 23/04; F25D 25/005; F25C 2300/00; F25C 5/00; F25C 5/18; F25C 5/182; F25C 5/185; F25C 5/187
See application file for complete search history.

(56) References Cited

U.S. PATENT DOCUMENTS

| | | | | |
|---|---|---|---|---|
| 3,722,927 A | * | 3/1973 | Miska | ..................... A45D 20/50 285/317 |
| 4,017,937 A | * | 4/1977 | Hanold | ................... A47L 9/242 15/327.1 |
| 4,245,879 A | * | 1/1981 | Buck | .................... H01R 13/627 439/345 |

(Continued)

FOREIGN PATENT DOCUMENTS

| | | | | |
|---|---|---|---|---|
| CN | 203605569 U | * | 5/2014 | ............. F25D 23/12 |
| DE | WO2007122048 A1 | * | 11/2007 | ............. F25D 23/06 |

(Continued)

*Primary Examiner* — Andrew Roersma

(57) ABSTRACT

There is provided a refrigerator having a locking device for an ice bucket and a method for installing a locking device for an ice bucket. A refrigerator having a locking device for an ice bucket, comprising: a main body; a storage space within the main body; an ice space configured to be disposed inside the main body, and partitioned from the storage space, and having a front opening; an ice bucket comprising an ice storage portion which stores ice generated within the ice space; and a cover member which is disposed in front of the ice storage portion to cover a front of the ice space and configured to be slidably installed in the ice space; and a locking device configured to lock the ice bucket within the ice space to prevent the ice bucket from being drawn out of the ice space by itself.

15 Claims, 6 Drawing Sheets

(56) References Cited

U.S. PATENT DOCUMENTS

2013/0134854 A1* 5/2013 You ................ F25D 23/028
 312/405
2013/0174599 A1 7/2013 Jeong et al.
2013/0263621 A1 10/2013 An et al.

FOREIGN PATENT DOCUMENTS

| GB | 2170547 A * | 8/1986 | ............... E05C 3/14 |
| IT | EP0829600 A1 * | 3/1998 | ............. E05B 65/00 |
| KR | 10-2009-0011658 | 2/2009 | |
| KR | 10-2009-0094421 | 9/2009 | |
| KR | 1020090131211 A * | 12/2009 | ............. F25D 25/02 |
| KR | 10-2013-0081137 | 7/2013 | |
| KR | 10-2013-0114848 | 10/2013 | |
| KR | 101351030 B1 * | 1/2014 | ............. F25D 25/02 |
| TR | WO03018943 A1 * | 3/2003 | ............. F25D 23/02 |
| TR | WO2015144238 A1 * | 10/2015 | ............. F25D 23/02 |

* cited by examiner

REFRIGERATOR HAVING LOCKING DEVICE FOR ICE BUCKET AND METHOD FOR INSTALLATION OF LOCKING DEVICE OF ICE BUCKET

RELATED APPLICATIONS

This application is based on and claims priority to Korean Patent Application No. 10-2015-0085834, filed on Jun. 17, 2015, the disclosure of which is incorporated herein in its entirety by reference.

FIELD OF THE INVENTION

Embodiments of the present invention generally relate to a refrigerator having an ice bucket and a method for installing a device for an ice bucket.

BACKGROUND OF THE INVENTION

A refrigerator is a device for low temperature storage of food and may be configured to provide freezing storage or cold storage according to the type of food which a user wants to store.

The inside of the refrigerator is continuously supplied by cold air. The cold air is continuously generated by a heat exchange process with a refrigerant which goes through a process of compression-condensation-expansion-evaporation. The cold air supplied to the inside of the refrigerator is evenly transferred by convection to maintain the food in the refrigerator at a desired temperature.

Generally, a main body of the refrigerator has a rectangular parallelepiped shape of which the front surface is opened and the inside of the main body may be provided with a refrigerating space and a freezing space. Further, the front surface of the main body may be provided with a refrigerating space door and a freezing space door for selective accessing of a portion of the refrigerator. A storage space in the refrigerator may be provided with multiple drawers, shelves, receiving boxes, etc., in which various food may be stored in an optimal condition.

Traditionally, a top mount type refrigerator has a freezing space positioned in an upper portion and has a refrigerating space positioned in a lower portion. Recently, however, for user convenience, a bottom freezer type refrigerator in which the freezing space is positioned in a lower portion has been released. In the case of the bottom freezer type refrigerator, a frequently used refrigerating space is positioned in an upper portion and a relatively less used freezing space is positioned in a lower position. Thus a user may conveniently use the refrigerating space. However, since the freezing space is positioned in the lower portion, the bottom freezer type refrigerator has a problem in that a user needs to bend over to open the freezing space door to remove ice.

To solve the above problem, recently, a refrigerator has been released in which an ice dispenser is installed at the refrigerating space door positioned in the upper portion of the bottom freezer type refrigerator. In this case, the refrigerating space door or the inside of the refrigerating space may be provided with an ice machine.

The ice machine may include an ice space which includes an ice tray that generates ice, an ice bucket in which the generated ice is stored, and a transfer assembly transferring the ice stored in the ice bucket to the dispenser.

The ice bucket may be drawn into the ice space or drawn out of the ice space while sliding through the opened front surface of the ice space. Further, the refrigerator may include a locking device which locks the ice bucket to prevent the ice bucket from being drawn out of the ice space by itself.

The existing locking device for the ice bucket is provided with a projection fixed at one side thereof and prevents the ice bucket from being drawn out of the ice space by itself by locking or unlocking a locking portion. The locking part is locked to the projection, or from the projection, by a spring and an opening button.

However, the existing locking device as described above is inconvenient because operating the opening button requires both hands. Further, the existing locking device has a complicated structure due to the spring and the opening button being separately installed and thus has a high failure rate, increased cost of materials, etc.

Further, since the existing locking device uses a metal spring, when the locking device is used for a long period of time, the locking device may have reduced elastic force due to spring aging or may not operate due to spring corrosion. As a result, the operating performance of the ice bucket may be reduced.

SUMMARY OF THE INVENTION

In view of the above, embodiments of the present invention provide a refrigerator having a locking device for an ice bucket and a method for installing a locking device for an ice bucket capable of increasing user convenience by allowing a user to draw out the ice bucket with one hand, having reduced material cost, and improved durability through simplified structures.

Further, embodiments of the present invention provide a refrigerator having a locking device for an ice bucket and a method for installing a locking device for an ice bucket capable of increased reliability by providing an elastic force without the need of a metal spring to maintain the elastic force during long-term use.

In accordance with an embodiment of the present invention, there is provided a refrigerator having a locking device for an ice bucket, the refrigerator including: a main body; a storage space formed inside the main body; an ice space inside the main body and partitioned from the storage space and having a front opening. The refrigerator further includes an ice bucket including an ice storage portion which stores ice generated in the ice space and a cover member which is disposed in front of the ice storage portion to cover the front of the ice space and slidably installed in the ice space to open and close the ice space. The refrigerator further includes a locking device configured to lock the ice bucket to the ice space to prevent the ice bucket from being drawn out of the ice space by itself. The locking device includes: a projection configured to protrude from an inner side of the ice space toward the ice bucket; an elasticity module portion disposed in at least one of an upper portion and a lower portion of the ice bucket and including an elastic piece which has one end fixed to the ice bucket and the other end in a free state to provide an elastic force; and a locking cover including a hook portion which is applied with an elastic force from the elastic piece and to be locked to the projection. The locking cover is coupled with the elasticity module portion to cover the elasticity module portion.

The elasticity module portion may be integrally formed in the ice bucket.

The elastic piece may include: a wave portion configured to be bent in a wave shape with a predetermined length extending from a point fixed to the ice bucket toward the free end to produce the elastic force; and a plane portion flatly formed from the wave portion to the free end to push portion the hook portion of the locking cover toward the projection.

The hook portion may include: an elastic support portion configured to have a substantially square shape and have a surface coupled to the locking cover and a plurality of surfaces (e.g., three) cut to move independently from the locking cover; a protrusion configured to protrude toward a free end of the elastic support portion to be locked to the projection; and an extending arm configured to extend from a surface of the protrusion of the elastic support portion toward the elastic piece to be applied with an elastic force.

The locking cover may be separably coupled with the elasticity module portion.

The locking device may be installed at either of the upper portion and the lower portion of the ice bucket, and the other portion of the ice bucket may be disposed with a first locking hook extending from the ice space and a second locking hook, extending from the ice bucket, to be locked to the first locking hook.

The locking device may be installed at both the upper portion and the lower portion of the ice bucket.

In accordance with another embodiment of the present invention, there is provided a method for installing a locking device for an ice bucket, the method including: forming an elasticity module portion including an elastic piece of which one end is fixed and the other end is in a free end disposed in at least one of an upper portion and a lower portion of the ice bucket in a refrigerator; molding a locking cover including a hook portion protruding from a side thereof; coupling the locking cover with the elasticity module portion so that a surface contacts a free end of the elastic piece; and installing a projection protruding from an inner side of an ice space of the refrigerator and extending toward the ice bucket so that the hook portion is locked.

The elastic piece may be molded to have a wave portion bent in a wave shape with a predetermined length extending from a point fixed to the ice bucket toward a free end to produce the elastic force and a plane portion flatly formed from the wave portion to the free end to push the hook portion of the locking cover toward the projection.

The hook portion may have a substantially square shape and may be molded to include an elastic support portion having a surface coupled to the locking cover and a plurality of surfaces (e.g., three) cut to move independently from the locking cover, a protrusion protruding to the free end of the elastic support portion to be locked to the projection, and an extending arm extending from a surface of the protrusion of the elastic support portion toward the elastic piece to be applied with the elastic force.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Figure 1:
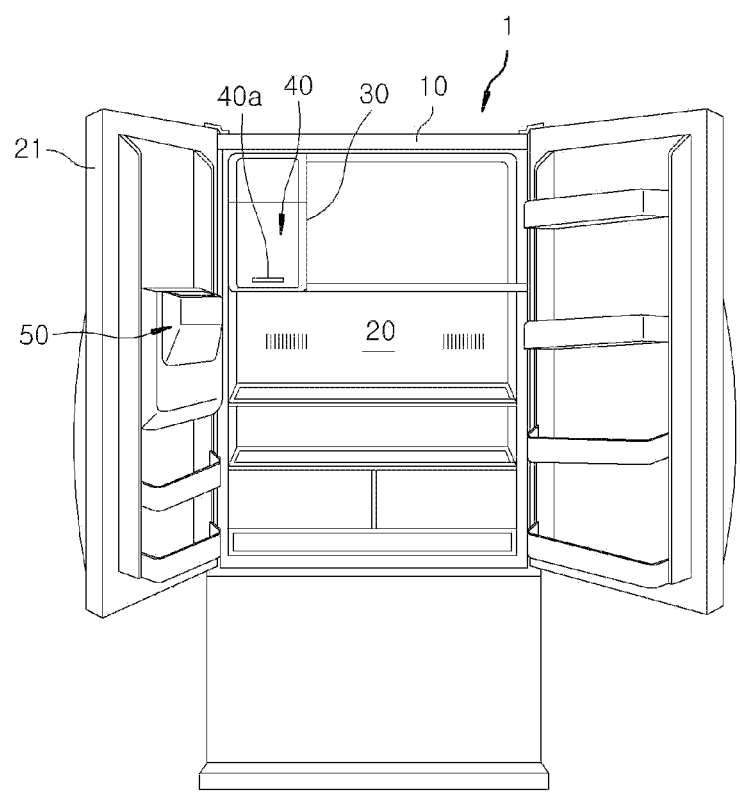
FIG. 1 is a front view of an exemplary refrigerator according to an embodiment of the present invention.

Hereinafter, constructions and actions according to embodiments of the present invention will be described in detail with reference to the accompanying drawings. The following description is one of aspects of the present invention which may be claimed as a patent and may form a portion of the detailed technologies of the present invention.

However, in describing the embodiments of the present invention, a detailed description of well-known constructions or functions will be omitted to make the present invention clear.

The present invention may be variously changed and include various embodiments, so that specific embodiments are illustrated in the drawings and will be described in detail below. However, it is to be understood that the present invention is not limited to the specific embodiments, but includes all modifications, equivalents, and substitutions included in the spirit and the scope of the present invention.

Terms including an ordinal number such as 'first', 'second', etc., can be used to describe various components, but the components are not to be construed as being limited to the terms. The terms are only used to distinguish one component from another component.

Terms used in the present application are used only in order to describe specific embodiments rather than limiting the present invention. Singular forms are intended to include plural forms unless the context clearly indicates otherwise. It will be further understood that the terms "comprises" or "have" used in this application, specify the presence of stated features, numerals, steps, operations, components, parts, or a combination thereof, but do not preclude the presence or addition of one or more other features, numerals, steps, operations, components, parts, or a combination thereof.

Hereinafter, one embodiment of the present invention will be described with reference to the accompanying drawings.

Figure 2:
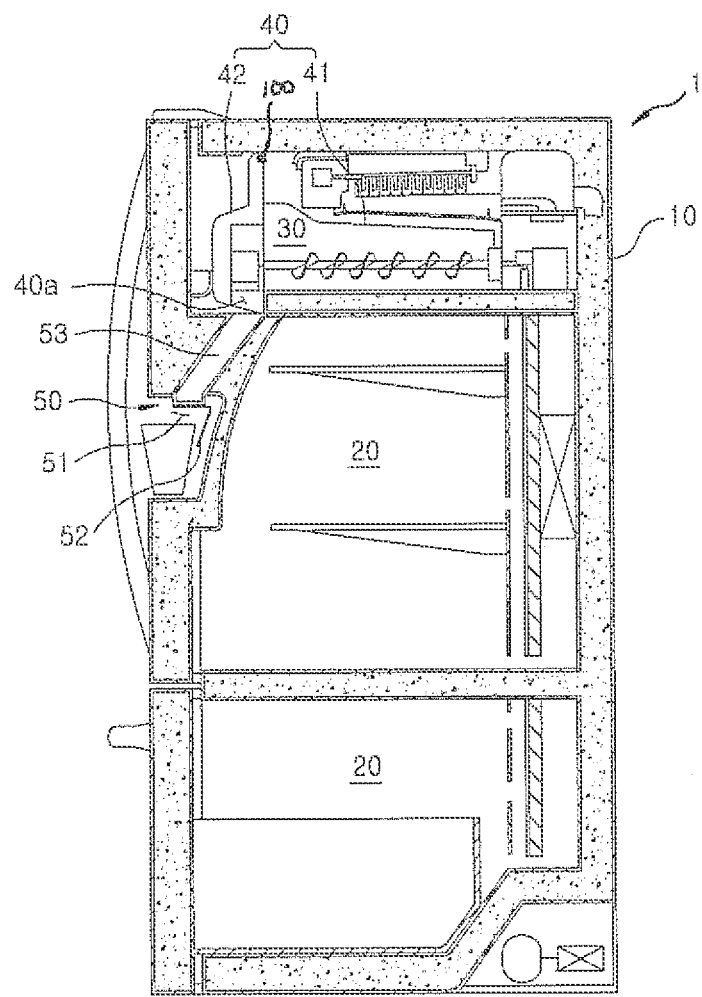
FIG. 2 is a side cross-sectional view of the refrigerator of FIG. 1.

FIG. 1 is a front view of an exemplary refrigerator according to an embodiment of the present invention and FIG. 2 is a side cross-sectional view of the refrigerator of FIG. 1.

Referring to FIGS. 1 and 2, a refrigerator 1 having a locking device 100 for an ice bucket 40 according to an embodiment of the present invention may include a main body 10, a storage space 20, an ice space 30, the ice bucket 40, and the locking device 100.

The description that an embodiment of the present invention includes the components listed above does not mean that the present invention does not include only the above components but means that the present invention can include these components and that the present invention may include other components (for example, technologies widely known with respect to refrigerators). However, the detailed description of known technologies will be omitted if it is deemed that such description would make the description of the present invention unnecessarily vague.

The main body 10 forms the appearance and supporting structure of the refrigerator 1 and may provide a space in which the components listed above and other components used in the operation of the refrigerator 1 may be formed or installed therein.

The storage space 20 is formed inside the main body 10 and has a front surface opening. The storage space 20 may be partitioned into a refrigerating space and a freezing space by a partition wall.

The front surface of the storage space 20 may be opened and closed by a pair of doors 21 which rotate and are hinge-coupled with the main body 10. The door 21 may be provided with a dispenser 50 which may extract ice generated in the ice space 30 from the outside without opening the door 21.

The dispenser 50 may include an extraction space 51 which may allow ice to be dispensed, a lever 52 which may select whether to extract ice, and a chute 53 which guides ice discharged through an ice discharge port 40a of the ice bucket 40 to the extraction space 51.

Further, the ice space 30 may be disposed inside the main body 10 and partitioned from the storage space 20. The ice space 30 may be formed to have a front opening. The ice space 30 may be disposed at one side of the storage space 20 and may be partitioned from the storage space 20 by a wall of the ice space.

The ice space 30 may be provided with an ice assembly to generate ice, the ice assembly may be of any well-known design and therefore a detailed description thereof will be omitted.

Further, the ice bucket 40 may be slidably installed in the ice space 30 to open and close the ice space 30. The ice bucket 40 may include an ice storage portion 41 which stores ice generated in the ice space 30 and a cover member 42 which is disposed in front of the ice storage portion 41 to cover the front of the ice space 30.

Further, the locking device 100 may lock the ice bucket 40 to the ice space 30 to prevent the ice bucket 40 from being drawn out of the ice space 30 by itself. When the ice bucket 40 is locked to the ice space 30 by the locking device 100, the ice bucket 40 may not be drawn out from the ice space 30 by itself as long as a user does not apply an external force and may be kept in a locking state.

Hereinafter, the locking device 100 will be described in detail with reference to FIGS. 3 to 5.

Figure 3:
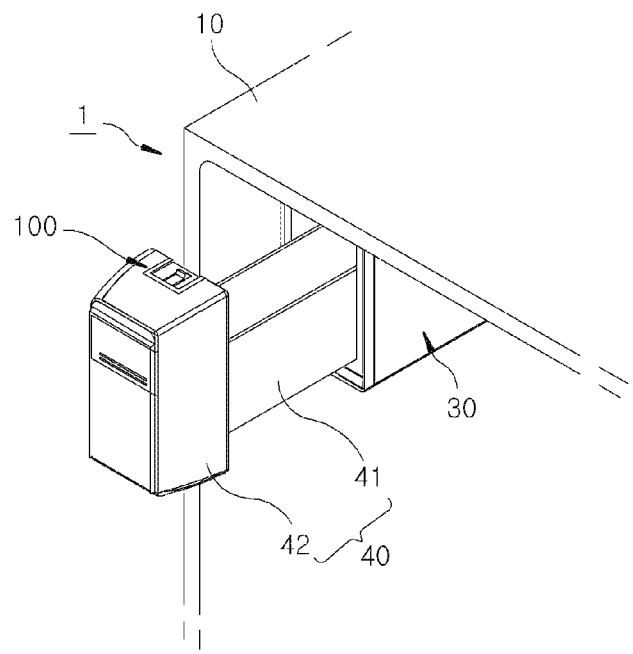
FIG. 3 is a perspective view illustrating an ice bucket that is drawn out from an ice space of the refrigerator illustrated in FIG. 1.
Figure 4:
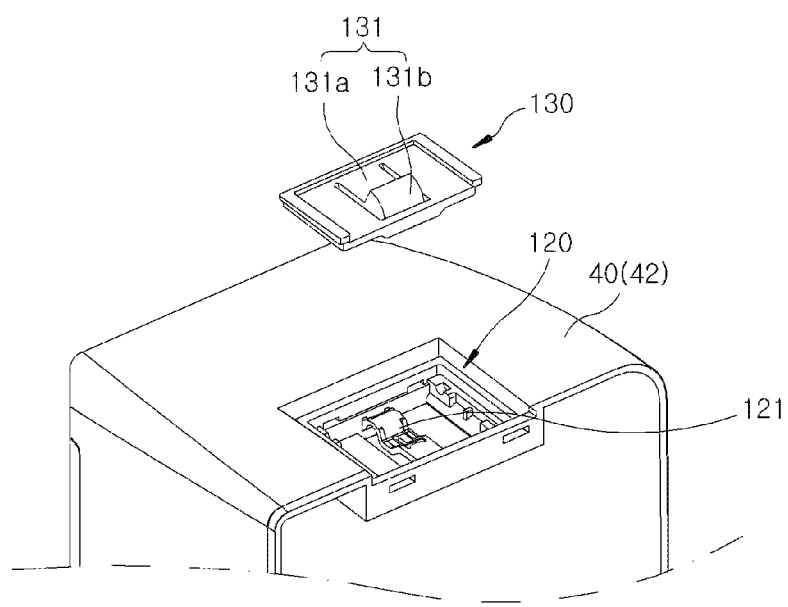
FIG. 4 is an exploded view illustrating an exemplary locking device for an ice bucket according to an embodiment of the present invention.
Figure 5:
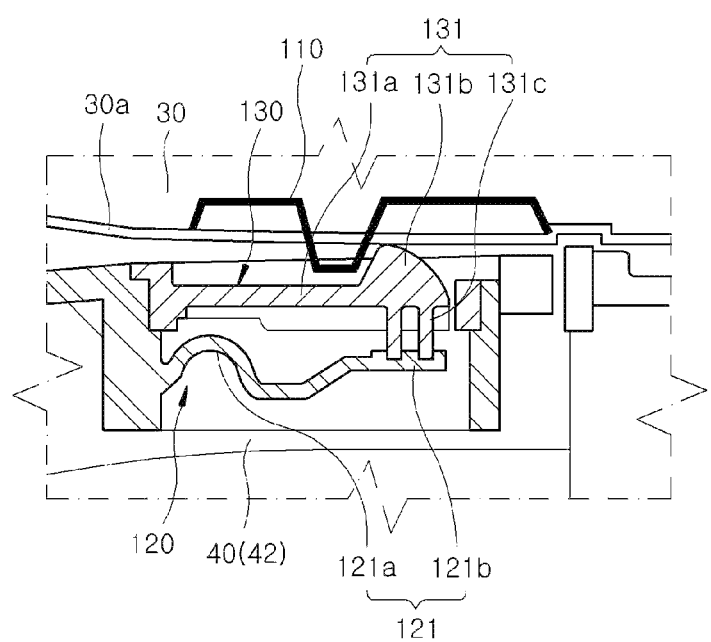
FIG. 5 is a side cross-sectional view illustrating a locking state of the locking device for the ice bucket according to an embodiment of the present invention.

FIG. 3 is a perspective view illustrating an ice bucket that is drawn out from the ice space of the refrigerator illustrated in FIG. 1, FIG. 4 is an exploded view illustrating the locking device for the ice bucket according to the embodiment of the present invention, and FIG. 5 is a side cross-sectional view illustrating the locking state of the locking device according to an embodiment of the present invention.

Referring to FIGS. 3 to 5, the locking device 100 may include a projection 110 formed inside the ice space 30, an elasticity module portion 120 formed in the ice bucket 40, and a locking cover 130.

As illustrated in FIG. 5, the projection 110 may protrude from an inner side of the ice space 30 toward the ice bucket 40.

In one embodiment, when the projection 110 is installed on the ceiling 30a of the ice space 30, the projection 110 may be disposed to protrude downward from a position contacting the cover member 42 of the ice bucket 40. Further, when the projection 110 is installed on the floor of the ice space 30, the projection 110 may be disposed to protrude upward from a position contacting the cover member 42 of the ice bucket 40 or the ice storage portion 41.

As illustrated in FIG. 4, the elasticity module portion 120 may be a depression formed in at least one of the upper portion and the lower portion of the ice bucket 40. The elasticity providing portion 120 may be integrally formed in the ice bucket 40.

The elasticity module portion 120 may be provided with the elastic piece 121 which is configured to produce an elastic force.

One end of the elastic piece 121 is fixed to the ice bucket 40 and the other end is free from (e.g., not connected to) the ice bucket 40 and thus may be formed in the free end state.

As illustrated in FIGS. 4 and 5, the elastic piece 121 may include a wave portion 121a and a plane portion 121b.

The wave portion 121a has a structure that increases the elastic force of the elastic piece 121 and the wave portion 121a may be bent in a wave shape with a predetermined length that extends from a point fixed to the ice bucket 40 toward the free end. The wave portion 121a has a structure in which protrusions and depressions are repeated, and as a result, its ability to provide elastic force may be increased and is less likely to be deformed or destroyed even though substantial force is applied to the wave portion 121a. Further, the plane portion 121b is flatly formed from the wave portion 121a toward the free end and thus may contact the locking cover 130 to provide an elastic force.

Further, the locking cover 130 is coupled with the elasticity module portion 120 and receives the elastic force from the elastic piece 121 and may cover a portion of the elasticity providing portion 120. The locking cover 130 may be formed approximately with a flat side and another side thereof may be disposed with a hook portion 131 protruding to a predetermined height on one side thereof to be locked to the projection 110 by the elastic force from the elastic piece 121.

As illustrated in FIG. 5, the hook portion 131 may include an elastic support portion 131a, a protrusion 131b, and an extending arm 131c.

The elastic support portion 131a may have a substantially square shape and may be formed in a structure with a surface integrally coupled with the locking cover 130 and a plurality of surfaces (e.g., the other three surfaces) cut to move independently from the locking cover 130. Therefore, one end of the elastic support portion 131a may be a fixed end which is fixed to the locking cover 130 and the end opposite thereto may be a free end.

Further, the protrusion 131b may be formed to protrude from the free end of the elastic support portion 131a and to be locked to the projection 110. The extending arm 131c extends from the opposing surface of the protrusion 131b of the elastic support portion 131a toward the elastic piece 121 and thus may easily receive the elastic force of the elastic piece 121.

Therefore, the elastic force exerted from the elastic piece 121 (for example, the plane portion 121b of the elastic piece 121) is applied to the protrusion 131b through the extending arm 131c and the protrusion 131b is locked into the projection 110 while moving in the same direction as the elastic force.

The locking cover 130 may be separably coupled with the elasticity module portion 120. Therefore, a portion of the locking cover 130 may also be separated from the elasticity module portion 120 as needed when the locking cover 130 is coupled with the elasticity module portion 120.

Figure 6:
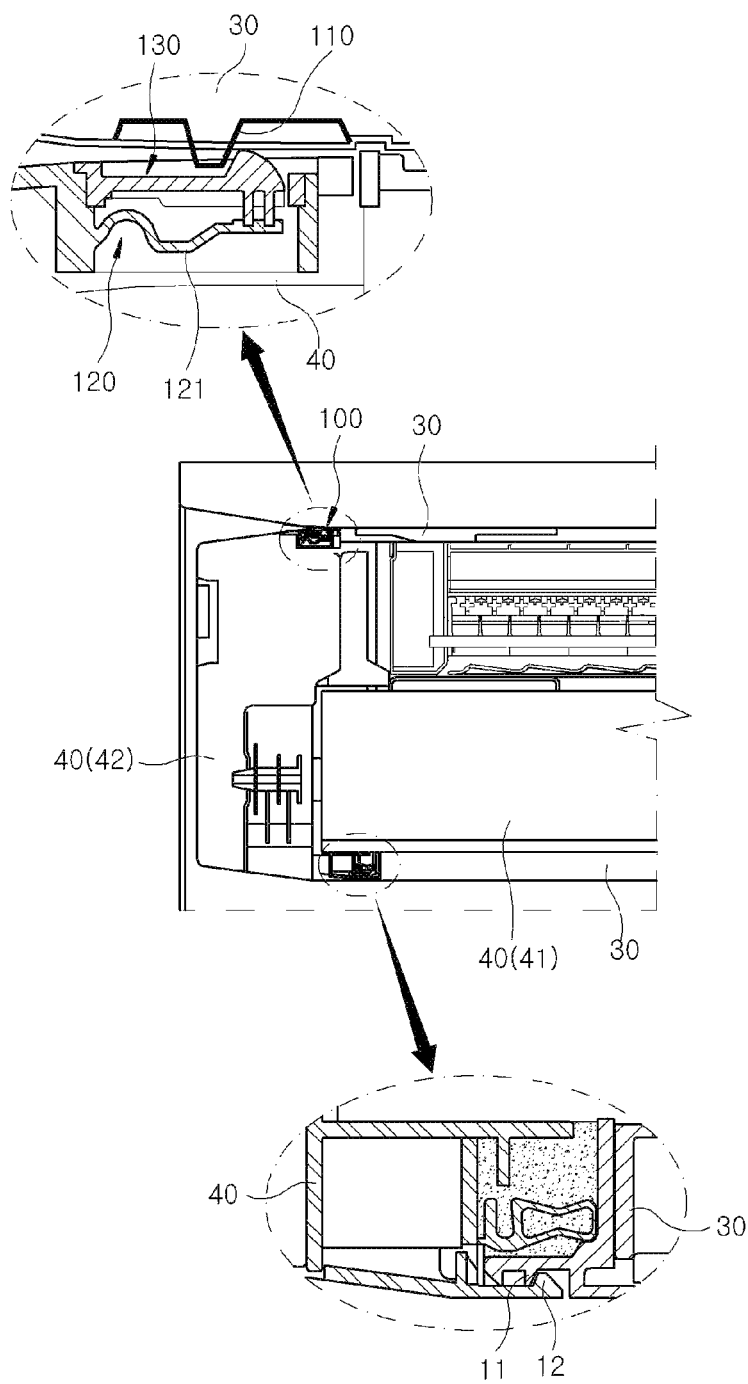
FIG. 6 is a diagram illustrating an exemplary locking device of the ice bucket, according to an embodiment of the present invention, installed at one of an upper portion and a lower portion of the ice bucket.

As illustrated in FIG. 6, the locking device 100 is installed at one of the upper portion and the lower portion of the ice bucket 40. One of the upper portion and the lower portion of the ice bucket 40 may include a first locking hook 11 extending from the ice space 30. A second locking hook 12 may extend from the ice bucket 40 to be locked to the first locking hook 11.

FIG. 6 illustrates that the upper portion of the ice bucket 40 is disposed with the locking device 100 and the lower portion of the ice bucket 40, at which the locking device 100 is not installed, may be disposed with the first locking hook 11 and the second locking hook 12 to lock between the ice space 30 and the ice bucket 40. In another embodiment, the lower portion of the ice bucket 40 is disposed with the locking device 100 and the upper portion of the ice bucket 40 may be provided with the first locking hook 11 and the second locking hook 12 to lock between the ice space 30 and the ice bucket 40.

Figure 7:
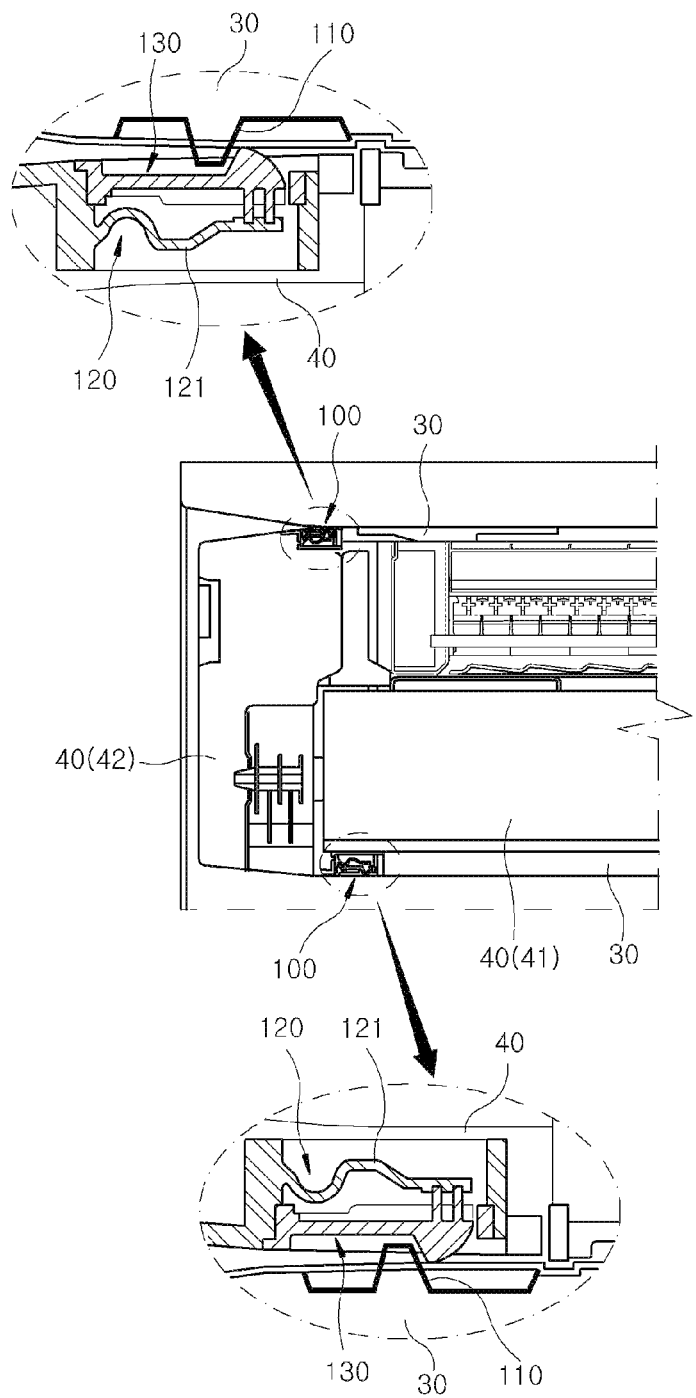
FIG. 7 is a diagram illustrating a locking device of the ice bucket, according to an embodiment of the present invention, installed at both the upper portion and the lower portion of the ice bucket.

Moreover, as illustrated in FIG. 7, the locking device 100 may also be installed both at the upper portion and the lower portion of the ice bucket 40.

Hereinafter, a method for installing a locking device 100 for an ice bucket 40 according to another embodiment of the present invention will be described and a detailed description thereof will cite the foregoing description.

According to the method for installing a locking device 100 for an ice bucket 40, the elasticity module portion 120 is configured to provide the elastic force and may be formed as any one of the upper portion and the lower portion of the ice bucket 40 which is disposed in the refrigerator.

The elasticity module portion 120 may include the elastic piece 121 and the elastic piece 121 may be integrally molded in the ice bucket 40 with one end fixed to the ice bucket 140 and the other end in a free state.

The elastic piece 121 may be molded to have a wave portion 121a bent in a wave shape, with a predetermined length and extending from a point fixed to the ice bucket 40 toward the free end to produce the elastic force, and the plane portion 121b flatly formed from the wave portion 121a toward the free end.

Further, the locking cover 130 may be provided separately from the elasticity module portion 120. The locking cover 130 may be injection-molded so that the hook portion 131 protrudes on one side thereof. The hook portion 131 may have a substantially square shape and may be molded to include the elastic support portion 131a having one surface coupled to the locking cover 130 and three surfaces cut to be separated from the locking cover 130. The protrusion 131b protrudes toward the free end of the elastic support portion 131a to be locked to the projection 110 and the extending arm 131c extends from another surface of the protrusion 131b of the elastic support portion 131a toward the elastic piece 121 and is applied with the elastic force.

As such, after the elasticity module portion 120 is formed in the ice bucket 40 and the locking cover 130 is molded separately therefrom, the locking cover 130 may be coupled with the elasticity module portion 120 so that a surface of the hook portion 131 contacts the free end of the elastic piece 121. Further, the projection 110 is disposed at the inner side of the ice space 30 of the refrigerator so that the hook portion 131 is locked with a portion of the projection 110 protruding toward the ice bucket 40, and as a result the installation of the locking device 100 is complete.

According to the embodiment of the present invention, the user may advantageously draw out the ice bucket with one hand to increase the convenience of the ice bucket and the structure may be simplified to save material cost and improve durability.

Further, the elastic force may be provided without need of the spring of the metal material and therefore the same elastic force is maintained even after long-term use, thereby increasing the reliability of products.

While the embodiments of the present invention have been described with respect to the preferred embodiments, the scope of the present invention is not limited to the specific embodiments. It will be understood that a person having ordinary skill in the art to which the present invention pertains may substitute and change components without any limitation and these substitutions and changes also belong to the scope of the present invention.

What is claimed is:

1. A refrigerator having a locking device for an ice bucket, the refrigerator comprising:
   a main body;
   a storage space within the main body;
   an ice space disposed inside the main body, and partitioned from the storage space, and having a front opening;
   an ice bucket comprising: an ice storage portion for storing ice generated within the ice space; and a cover member which is disposed in front of the ice storage portion to cover a front of the ice space and configured to be slidably installed in the ice space; and
   a locking device configured to lock the ice bucket within the ice space to prevent the ice bucket from being drawn out of the ice space by itself, wherein the locking device comprises:
      a projection configured to protrude from an inner side of the ice space toward the ice bucket;
      an elasticity module portion arranged in at least one of an upper portion and a lower portion of the ice bucket and comprising an elastic piece with one end fixed to the ice bucket and another end in a free state and configured to provide an elastic force without using a spring of a metal material; and
      a locking cover comprising a hook portion for receiving the elastic force from the elastic piece, wherein the hook portion is configured to be locked to the projection, and wherein the locking cover is coupled with the elasticity module portion and is configured to cover a portion thereof;
   wherein the elastic piece includes:
      a wave portion bent in a substantially wave shape with a predetermined length to produce the elastic force; and
      a plane portion flatly formed and coupled to the wave portion toward the free end and configured to push the hook portion of the locking cover toward the projection;
   wherein the hook portion includes:
      an elastic support portion having a substantially square shape and including a surface coupled to the locking cover; and a plurality of surfaces cut to move independently from the locking cover;
      a protrusion protruding toward a free end of the elastic support portion and configured to be locked to the projection; and
      an extending arm extending from a surface opposite the protrusion of the elastic support portion toward the elastic piece and configured to be applied with the elastic force;
   and wherein the free end of the elastic support portion of the locking cover is separably coupled with the free end of the elasticity module portion.

2. The refrigerator of claim 1, wherein the elasticity module portion is integrally formed in the ice bucket.

3. The refrigerator of claim 1, wherein the locking device is disposed in one of the upper portion and the lower portion of the ice bucket and wherein an opposing side of the ice bucket comprises a first locking hook extending from the ice space and comprising:
a second locking hook extending from the ice bucket lock to the first locking hook.

4. The refrigerator of claim 1, wherein a first locking device is disposed in the upper portion of the ice bucket and a second locking device is disposed at the lower portion of the ice bucket.

5. The refrigerator of claim 1, wherein the predetermined length of the wave portion extends from a point fixed to the ice bucket to the free end.

6. The refrigerator of claim 1, wherein the locking cover is formed with a flat side and another side of the locking cover is disposed with the hook portion protruding to a predetermined height from the flat side to be locked to the projection by the elastic force from the elastic piece.

7. A method for installing a locking device for an ice bucket, the method comprising:
forming an elasticity module portion without using a spring of a metal material, the elasticity module portion comprising an elastic piece wherein one end is fixed and the other end is in a free end, wherein the elasticity module portion is formed in at least one of an upper portion and a lower portion of the ice bucket disposed in a refrigerator;
molding a locking cover comprising a hook portion protruding from a side thereof;
coupling the locking cover with the elasticity module portion, wherein a surface contacts the free end of the elastic piece; and
installing a projection protruding from an inner side of an ice space of the refrigerator toward the ice bucket to lock the hook portion thereto;
wherein the elastic piece is molded to have a wave portion bent in a substantially wave shape with a predetermined length, extending from a point fixed to the ice bucket toward the free end, to produce the elastic force and a plane portion flatly formed and coupled to the wave portion toward the free end and configured to push the hook portion of the locking cover toward the projection;
wherein the hook portion has a substantially square shape and is molded to comprise an elastic support comprising: a surface coupled to the locking cover, and a plurality of surfaces cut to more independently from the locking cover, wherein the elastic support comprises a protrusion protruding from the free end of the elastic support portion and configured to be locked to the projection, and an extending arm extending from the opposing surface of the protrusion of the elastic support portion toward the elastic piece and to be applied with the elastic force;
and wherein the free end of the elastic support portion of the locking cover is separably coupled with the free end of the elasticity module portion.

8. The method of claim 7, wherein the predetermined length of the wave portion extends from a point fixed to the ice bucket to the free end.

9. The method of claim 7, wherein the locking cover is formed with a flat side and another side of the locking cover is disposed with the hook portion protruding to a predetermined height from the flat side to be locked to the projection by the elastic force from the elastic piece.

10. An apparatus comprising:
an ice bucket including: an ice storage portion for storing ice generated within an ice space; and a cover member which is disposed in front of the ice storage portion to cover a front of the ice space and configured to be slidably installed in the ice space; and
a locking device configured to lock the ice bucket within the ice space to prevent the ice bucket from being drawn out, wherein the locking device includes:
a projection configured to protrude from an inner side of the ice space toward the ice bucket;
an elasticity module including an elastic piece with one end fixed to the ice bucket and another end in a free state and configured to provide an elastic force; and
a locking cover including a hook portion which receives the elastic force from the elastic piece, wherein the hook portion is configured to be locked to the projection, and wherein the locking cover is coupled with the elasticity module and is configured to cover a portion of the elasticity module;
wherein the elastic piece includes:
a wave portion bent in a substantially wave shape with a predetermined length to produce the elastic force; and
a plane portion flatly formed and coupled to the wave portion toward the free end and configured to push the hook portion of the locking cover toward the projection;
wherein the hook portion includes:
an elastic support portion having a substantially square shape and including a surface coupled to the locking cover and a plurality of surfaces cut to move independently from the locking cover;
a protrusion protruding toward a free end of the elastic support portion and configured to be locked to the projection; and
an extending arm extending from a surface opposite the protrusion of the elastic support portion toward the elastic piece and configured to receive the elastic force;
and wherein the elasticity module provides an elastic force without using a spring of a metal material and the free end of the elastic support portion of the locking cover is separably coupled with the free end of the elasticity module portion.

11. The apparatus of claim 10, wherein the elasticity module portion is integrally formed in the ice bucket.

12. The apparatus of claim 10, wherein the locking device is disposed in one of the upper portion and the lower portion of the ice bucket, and wherein an opposing side of the ice bucket comprises a first locking hook extending from the ice space and comprising:
a second locking hook extending from the ice bucket lock to the first locking hook.

13. The apparatus of claim 10, wherein a first locking device is disposed in the upper portion of the ice bucket and a second locking device is disposed at the lower portion of the ice bucket.

14. The apparatus of claim 10, wherein the predetermined length of the wave portion extends from a point fixed to the ice bucket to the free end.

15. The apparatus of claim 10, wherein the locking cover is formed with a flat side and another side of the locking cover is disposed with the hook portion protruding to a predetermined height from the flat side to be locked to the projection by the elastic force from the elastic piece.

* * * * *